(12) United States Patent
Pandurangan et al.

(10) Patent No.: US 10,880,071 B2
(45) Date of Patent: Dec. 29, 2020

(54) PROGRAMMABLE BLOCKCHAIN SOLID STATE DRIVE AND SWITCH

(71) Applicant: Samsung Electronics Co., Ltd., Suwon-si (KR)

(72) Inventors: Rajinikanth Pandurangan, Fremont, CA (US); Vijay Balakrishnan, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 15/981,460

(22) Filed: May 16, 2018

(65) Prior Publication Data

US 2019/0268141 A1 Aug. 29, 2019

Related U.S. Application Data

(60) Provisional application No. 62/634,651, filed on Feb. 23, 2018.

(51) Int. Cl.
*H04L 9/06* (2006.01)
*H04L 9/14* (2006.01)
(Continued)

(52) U.S. Cl.
CPC .......... *H04L 9/0637* (2013.01); *G06F 3/0679* (2013.01); *G06F 21/602* (2013.01); *G06F 21/72* (2013.01); *G06F 21/76* (2013.01); *H04L 9/0643* (2013.01); *H04L 9/14* (2013.01); *H04L 9/3239* (2013.01); *H04L 67/1023* (2013.01); *H04L 67/1097* (2013.01); *H04L 67/104* (2013.01); *H04L 2209/38* (2013.01)

(58) Field of Classification Search
CPC .................................... H04L 9/0637

USPC .......................................................... 380/28
See application file for complete search history.

(56) References Cited

U.S. PATENT DOCUMENTS

| 9,934,138 B1* | 4/2018 | Bache ................... H04L 9/3236 |
| 2009/0287874 A1* | 11/2009 | Rogers ................ G06F 11/1441 711/103 |

(Continued)

FOREIGN PATENT DOCUMENTS

CN 107046542 A 8/2017

OTHER PUBLICATIONS

Truyens, Dries, "FPGA based hardware accelerator for Dash mining", Ku Leuven, Master of Science in Electrical Engineering, Thesis, Academic year 2015-2016, 62 pages.

*Primary Examiner* — Jacob Lipman
(74) *Attorney, Agent, or Firm* — Lewis Roca Rothgerber Christie LLP

(57) ABSTRACT

A programmable data storage device includes: a non-volatile memory; a storage controller configured to control the non-volatile memory; a network interface; and a field programmable gate array configured to: implement a blockchain algorithm; and store at least one block of a blockchain corresponding to the blockchain algorithm in the non-volatile memory via the storage controller; and a processor having memory coupled thereto, the memory having instructions stored thereon that, when executed by the processor, cause the processor to: send and receive one or more blocks of the blockchain via the network interface; and control the field programmable gate array to execute the blockchain algorithm on the one or more blocks of the blockchain.

19 Claims, 4 Drawing Sheets

(51) Int. Cl.
*G06F 21/60* (2013.01)
*G06F 21/76* (2013.01)
*G06F 3/06* (2006.01)
*G06F 21/72* (2013.01)
*H04L 29/08* (2006.01)
*H04L 9/32* (2006.01)

(56) References Cited

U.S. PATENT DOCUMENTS

2017/0228731 A1 8/2017 Sheng et al.
2017/0337534 A1* 11/2017 Goeringer ............. H04L 9/3239

* cited by examiner

PROGRAMMABLE BLOCKCHAIN SOLID STATE DRIVE AND SWITCH

CROSS-REFERENCE TO RELATED APPLICATION(S)

This application claims priority to, and the benefit of, U.S. Provisional Patent Application No. 62/634,651, filed in the United States Patent and Trademark Office on Feb. 23, 2018, the entire disclosure of which is incorporated by reference herein.

FIELD

Aspects of embodiments of the present invention relate to application-specific data storage devices.

BACKGROUND

Blockchain technology enables the establishment of a shared, secured, immutable, and distributed ledger over a peer-to-peer (P2P) network. Records such as the ownership of assets and transactions exchanging the ownership of those assets can be recorded on this "blockchain," and these records can be validated and maintained by peers (users) of the network.

Generally, blockchains include two types: public blockchains in which the users are anonymous and each user has a copy of the ledger and participates in validating transactions independently; and private blockchains in which the users are not anonymous and permission is required to be a part of the network (the users may still each have a copy of the ledger and participate in validating transactions).

A blockchain miner is a node in the peer-to-peer network that performs mining operations such as cryptographic hashes to generate a proof-of-work for adding new blocks to a blockchain. In some networks, a miner is provided with a reward for performing the mining. Miners can collaborate to form mining pool, where the mining power (e.g., computational power to compute hashes) is pooled, and the rewards for performing the mining are shared across the pool.

Examples of blockchain networks include Bitcoin, Ethereum, Dash, and Ripple. Alternative cryptographic technologies include the "Tangle" or Directed Acyclic Graph chain, which may relax the requirement that the blocks be arranged in a linear chain.

SUMMARY

Aspects of embodiments of the present invention relate to a programmable network storage device configured to implement features for storing blocks of blockchains and for participating as a mining node in a blockchain network (a "blockchain-aware storage device"). Aspects of embodiments of the present invention are also directed to programmable network hardware configured to manage blockchain-aware storage devices.

According to one embodiment of the present invention, a programmable data storage device includes: a non-volatile memory; a storage controller configured to control the non-volatile memory; a network interface; and a field programmable gate array configured to: implement a blockchain algorithm; and store at least one block of a blockchain corresponding to the blockchain algorithm in the non-volatile memory via the storage controller; and a processor having memory coupled thereto, the memory having instructions stored thereon that, when executed by the processor, cause the processor to: send and receive one or more blocks of the blockchain via the network interface; and control the field programmable gate array to execute the blockchain algorithm on the one or more blocks of the blockchain.

The storage controller may implement a key-value store, and the storage controller may be configured to store the at least one block of the blockchain as a value of the key-value store in association with a hash value of the block as a key.

The storage controller may be configured to store a first type of data and a second type of data in the non-volatile memory, wherein the first type of data may be blockchain data and the second type of data may be different from the first type of data.

The memory may have instructions stored thereon that, when executed by the processor, cause the processor to operate the programmable data storage device as a blockchain node of a blockchain network.

The storage controller may be configured to store data in the non-volatile memory in accordance with a first size, each block of the blockchain may have a second size, and the second size may be a multiple of the first size. The second size may be equal to the first size.

The non-volatile memory may include NAND flash, the storage controller may include a flash translation logic module, and the first size may be a NAND block size.

The memory may further have instructions stored thereon that, when executed by the processor, cause the processor: to load a bit file for programming the field programmable gate array to implement a second blockchain algorithm different from the blockchain algorithm; and program the field programmable gate array using the bit file to reconfigure the field programmable gate array to implement the second blockchain algorithm.

The bit file may be stored in the non-volatile memory. The bit file may be received via the network interface.

The field programmable gate array may include a cryptographic accelerator, and wherein the field programmable gate array may be configured to implement the blockchain algorithm using the cryptographic accelerator.

The programmable data storage device may further include: a second non-volatile memory; a second storage controller configured to control the second non-volatile memory; a second network interface; and a second field programmable gate array configured to: implement the blockchain algorithm; and store at least one block of the blockchain corresponding to the blockchain algorithm in the second non-volatile memory via the second storage controller; and a second processor having a second memory coupled thereto, the second memory having instructions stored thereon that, when executed by the second processor, cause the second processor to: send or receive one or more blocks of the blockchain via the second network interface; and control the second field programmable gate array to execute the blockchain algorithm on the one or more blocks of the blockchain.

According to one embodiment of the present invention, a programmable network data storage system includes: a first programmable data storage device including: a first non-volatile memory; a first storage controller configured to control the first non-volatile memory; a first network interface; and a first field programmable gate array configured to: implement a first blockchain algorithm; and store at least one block of a first blockchain corresponding to the first blockchain algorithm in the first non-volatile memory via the first storage controller; and a first processor having a first memory coupled thereto, the first memory having instructions stored thereon that, when executed by the first processor, cause the first processor to: send and receive one or more blocks of the blockchain via the first network interface; and control the first field programmable gate array to execute the first blockchain algorithm on the one or more blocks of the first blockchain; a second programmable data storage device including: a second non-volatile memory; a second storage controller configured to control the second non-volatile memory; a second network interface; and a second field programmable gate array configured to: implement a second blockchain algorithm; and store at least one block of a second blockchain corresponding to the second blockchain algorithm in the second non-volatile memory via the second storage controller; and a second processor having a second memory coupled thereto, the second memory having instructions stored thereon that, when executed by the second processor, cause the second processor to: send and receive one or more blocks of the second blockchain via the second network interface; and control the second field programmable gate array to execute the second blockchain algorithm on the one or more blocks of the second blockchain; network hardware configured to communicate with: the first programmable data storage device through the first network interface; the second programmable data storage device through the second network interface; and at least one blockchain network, the network hardware including a third processor and a third memory, the third memory having instructions stored thereon that, when executed by the third processor, cause the third processor to: receive a blockchain request from the at least one blockchain network; and distribute the blockchain request to at least one of the first programmable data storage device and the second programmable data storage device.

The first blockchain algorithm may be different from the second blockchain algorithm, the third memory of the network hardware may further have instructions stored thereon that, when executed by the third processor, cause the third processor to: determine whether the blockchain request is associated with at least one of the first blockchain algorithm and the second blockchain algorithm; in response to determining that the blockchain request is associated with the first blockchain algorithm, distribute the blockchain request the first programmable data storage device; and in response to determining that the blockchain request is associated with the second blockchain algorithm, distribute the blockchain request the second programmable data storage device.

The instructions to distribute the blockchain request may include instructions that, when executed by the third processor, cause the third processor to: divide the blockchain request into a plurality of sub-tasks; and distribute the sub-tasks to the first programmable data storage device and the second programmable data storage device.

The first memory may further have instructions stored thereon that, when executed by the first processor, cause the first processor to: load a bit file for programming the first field programmable gate array to implement a third blockchain algorithm different from the first blockchain algorithm; and program the first field programmable gate array using the bit file to reconfigure the first field programmable gate array to implement the third blockchain algorithm, and the third memory of the network hardware may further have instructions stored thereon that, when executed by the third processor, cause the third processor to: control the first processor of the first programmable data storage device to execute the instructions to reconfigure the first field programmable gate array to implement the third blockchain algorithm.

The third memory of the network hardware may further have instructions stored thereon that, when executed by the third processor, cause the third processor to: monitor states of each of the at least two blockchain networks; track a first status of the first programmable data storage device and a second status of the second programmable data storage device; identify a reassignment of the second programmable data storage device based on the states of each of the at least two blockchain networks, the first status, and the second status; and reconfigure the second field programmable gate array of the second programmable data storage device to implement the first blockchain algorithm in accordance with the reassignment.

The first storage controller may implement a key-value store, and the first storage controller may be configured to store the at least one block of the first blockchain as a value of the key-value store in association with a hash value of the block as a key.

The first memory may have instructions stored thereon that, when executed by the first processor, cause the first processor to operate the first programmable data storage device as a blockchain node of at a blockchain network of the at least one blockchain network.

The first storage controller may be configured to store data in the first non-volatile memory in accordance with a first size, each block of the first blockchain may have a second size, and the second size may be a multiple of the first size.

The first non-volatile memory may include NAND flash, the first storage controller may include a first flash translation logic module, and the first size may be a NAND block size.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
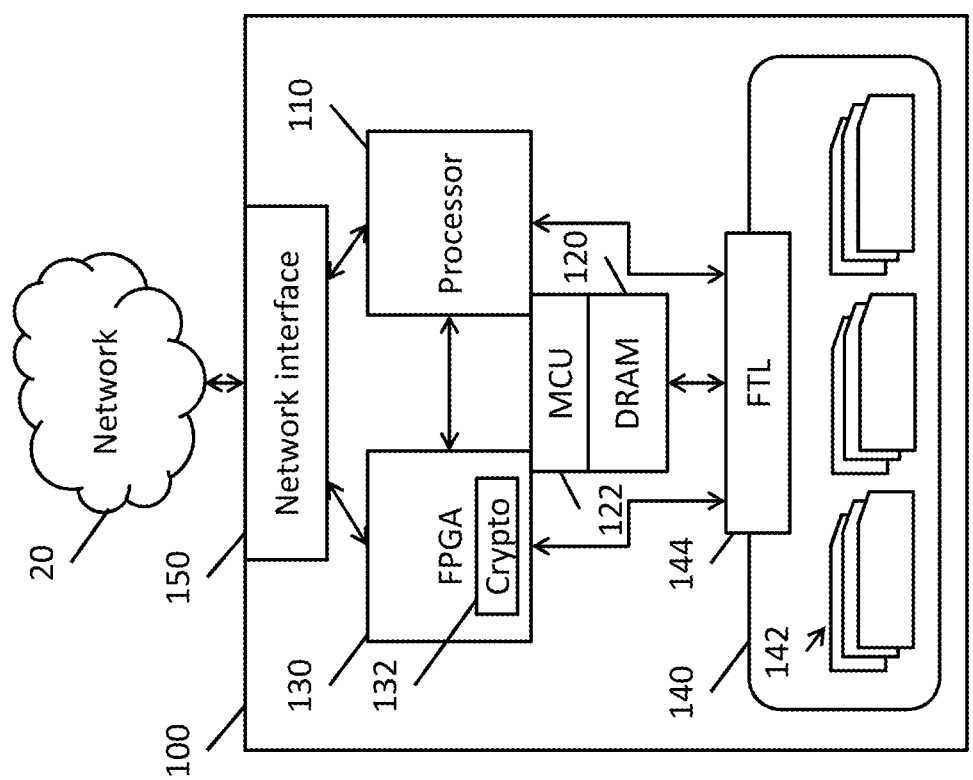
FIG. 1 is a schematic block diagram of a blockchain-aware storage device according to one embodiment of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

A network solid state drive (SSD) processes input/output (I/O) packets and issues read and write commands to non-volatile memory or persistent storage such as NAND flash memory. Each network SSD has its own processor to expose a network interface to the outside world (e.g., the processor may be configured to implement a networking stack, such as a Transmission Control Protocol/Internet protocol (TCP/IP) stack). The network SSD may also include a processing unit such as a central processing unit (CPU), a field programmable gate array (FPGA), and the like for performing additional processing.

A field programmable gate array (FPGA) includes a collection of programmable logic blocks and a hierarchy of reconfigurable interconnects that allow the programmable logic blocks to be selectively wired together, as specified by a configuration file (often referred to as a "bit file"). Accordingly, an FPGA can be configured and reconfigured to perform various functions (similar to a general purpose processor), while enabling performance (e.g., speed and energy efficiency) comparable to an application specific integrated circuit (ASIC).

Comparative systems for implementing blockchain miner nodes generally include the use of mining software running on computationally powerful computer systems. While bitcoin mining was initially performed profitably on general purpose central processing units (CPUs) (e.g., the rewards for mining exceed the cost of operating the processor), in many blockchain protocols the difficulty of mining (e.g., the amount of computational work that needs to be performed to mine a block) generally increases with the number of blocks on the blockchain. As a result, over time, blockchain mining has moved to processors that provide higher performance per watt for the computations required by the particular blockchain protocol such that the computations to be economically sensible (e.g., profitable). For example, the architectures of graphical processing units (GPUs) are well suited for mining Bitcoin.

For some blockchain protocols, even GPU-based implementations are relatively inefficient when compared with mining on field programmable gate arrays (FPGAs) and application specific integrated circuits. While an ASIC may generally be faster than an FPGA, the circuit implemented by an ASIC is permanent (e.g., the ASIC cannot be reconfigured) and therefore cannot be adapted to implement new algorithms or different algorithms, whereas an FPGA can be reconfigured by programming it with another bit file.

In addition to computational power, in order to execute the mining algorithm, blockchain miner nodes also generally need access to persistent data storage for storing at least a portion of the distributed ledger (e.g., the blockchain).

Miner nodes generally consume a significant amount of power due to its high usage of their processors and the significant amount of cooling needed to keep the processors within their standard operating ranges, whereas an FPGA generally does not require as much power to deliver similar performance and, accordingly, generally does not require as much cooling.

Accordingly, aspects of embodiments of the present invention are directed to a programmable network data storage device, such as a network solid state drive (SSD), that is configured to implement features for storing blocks of blockchains and for participating in a peer-to-peer blockchain network as a mining node (a "blockchain-aware storage device").

FIG. 1 is a schematic block diagram of a blockchain-aware storage device according to one embodiment of the present invention. In the embodiment shown in FIG. 1, a blockchain-aware storage device 100 includes several components that are integrated into a single device (e.g., populated on a single circuit board and/or housed within a single enclosure). The blockchain-aware storage device 100 of FIG. 1 includes a processor 110 that is configured to control the operation of the block-chain aware storage device. The processor 110 may be coupled to non-volatile memory (e.g., an erasable programmable read-only memory (EPROM) or flash memory separate from non-volatile memory 140 described below) storing firmware program instructions for controlling the blockchain-aware storage device. The processor 110 is configured to store and retrieve data from dynamic random access memory (DRAM) 120 through a memory controller unit (MCU) 122. The processor also communicates with a field programmable gate array (FPGA) 130, which may include a cryptographic accelerator 132. In some embodiments of the present invention, the cryptographic accelerator 132 is a separate from the FPGA 130 (e.g., separate, standalone chip) that is in communication with the FPGA 130. The FPGA 130 may also access the DRAM 120 through the MCU 122. The processor 110, the DRAM 120, and the FPGA 130 are all configured to store and retrieve data to and from non-volatile memory or persistent storage 140, which may include storage modules 142, through a storage controller 144. More specifically, in some embodiments, the storage modules 142 of the non-volatile memory 140 include NAND flash memory and the storage controller 144 includes a flash translation logic (FTL) module configured to translate between logical read and write commands and the underlying representation or storage of data in the NAND flash modules 142 (e.g., NAND blocks of NAND pages, see, e.g. FIG. 2). The processor 110 and the FPGA 130 may also communicate with a network interface 150 for transmitting and receiving data over a network 20 (e.g., an Ethernet connection).

Aspects of embodiments of the present invention relate to leveraging the FPGA 130 of the blockchain-aware storage device 100 connected to the network 20 to deploy a distributed ledger (e.g., a blockchain). The blockchain-aware storage device 100 can then be registered as a blockchain node (e.g., a mining node), where the blockchain-aware storage device 100 stores blocks of the blockchain (e.g., a copy of the full ledger or a portion thereof) in the non-volatile memory 140.

The particular mining algorithm associated with a particular blockchain protocol (e.g., Bitcoin, Ethereum, or Dash) is implemented in the FPGA 130, which reads and writes blocks of the blockchain data from and to the non-volatile memory 140. Blockchain algorithms generally involve the computation of a cryptographic hash such as sha-256, sha-1, Keccak, scrypt, and the like to perform the proof-of-work (PoW) portion of the mining protocol and to validate blocks of the blockchain received from other nodes.

Therefore, by implementing the blockchain algorithm and the cryptographic hash in hardware, significant reductions in energy usage and cooling are achieved. See, for example, Section 3.2 of Mittal, Sparsh, and Jeffrey S. Vetter. "A survey of methods for analyzing and improving GPU energy efficiency." *ACM Computing Surveys (CSUR)* 47.2 (2015): 19. for a list of references comparing the energy efficiency of implementing algorithms on specialized hardware such as GPUs and FPGAs over implementing those algorithms on general purpose CPUs.

Furthermore, because the mining algorithm is implemented in the FPGA 130, the FPGA 130 can be reconfigured to implement different mining algorithms. In some embodiments, the non-volatile memory 140 stores different bit files, where each bit file corresponds to the implementation of a different mining algorithm (e.g., mining algorithms for Bitcoin, Ethereum, or Dash) and the processor 110 is configured to reprogram the FPGA 130 with a particular one of the bit files. For example, a user of the blockchain-aware storage device 100 may decide to reconfigure the blockchain-aware storage device 100 to mine Ether instead of Bitcoin, and can do so by sending a command to the blockchain-aware storage device 100, which loads a bit file corresponding to the Ethereum mining algorithm and reprograms (e.g., flashes) the FPGA 130 using the loaded bit file. In some embodiments, the bit file is supplied to the blockchain-aware storage device 100 from an external source (e.g., over the network 20 through the network interface 150), thereby allowing new bit files corresponding to new (or revised) algorithms to be programmed into the FPGA 130 and/or stored in the non-volatile memory 140.

Figure 2:
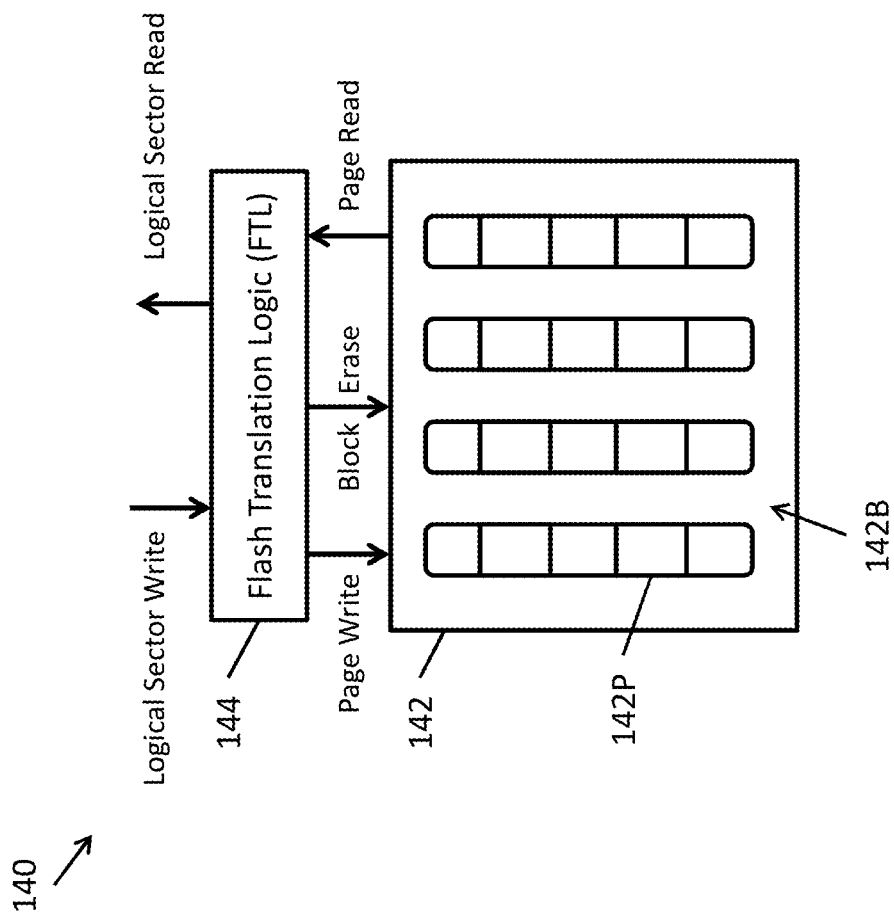
FIG. 2 is a schematic diagram of a flash translation logic and a flash storage module of a blockchain-aware storage device according to one embodiment of the present invention.

FIG. 2 is a schematic diagram of a flash translation logic and a flash storage module of a blockchain-aware storage device according to one embodiment of the present invention where the non-volatile memory 140 is implemented as NAND flash. As shown in FIG. 2, a NAND flash storage module 142 includes pages 142P of data that are organized into blocks 142B, where each block includes a plurality of pages. Due to implementation details of NAND flash storage technologies, data can typically be read and written on a per-page basis, but erasing data is performed on a per-block basis. The flash translation logic 144 translates between logical sector writes and reads and implementation-specific write and read commands (e.g., page writes, block erases, and page reads). In a logical block mode of accessing a storage device, the logical sectors may be, for example, 512 bytes in size. In some comparative NAND flash devices (e.g., solid state drives), each page may have a size of 4 KiB, and each block may have a size of 4 MiB.

In solid state drives (SSDs) that use flash memory (and also other devices that perform garbage collection), the flash memory is usually organized into erase blocks containing multiple pages. Each page may be in one of three states: free (currently not storing any data), valid (currently storing data), and invalid (previously storing valid data, but no longer storing valid data and not yet free).

When new data is written to the flash memory, a free page is located and the data written to that free page. The page is then marked as storing valid data. Pages are in order within an erase block. But Flash memory usually may be written to once at the page level; it may not be overwritten at the page level. Therefore when data stored in flash memory is to be changed by an application, the entire page containing the data is written to a new page in flash memory. The original page is then marked as invalid. Garbage collection is the process by which the SSD reclaims invalid pages at an erase block granularity of pages. This process includes resetting all the pages in a block and marking the pages as free once again.

The reason pages may have three possible states rather than just two is due to how garbage collection is performed. If garbage collection were performed on individual pages, there would be no need for the invalid state: garbage collection could occur as soon as the data was invalidated and the page immediately freed. But garbage collection typically operates on chunks larger than an individual page. These chunks are termed erase blocks or superblocks and may include any number of pages. When a block is subject to garbage collection, every page in the block is put in the free state. Therefore, any currently valid data in the block must be written to another free page in the flash memory in some other block (this process is termed programming) before the pages in the current block may be erased. If garbage collection were initiated as soon as any data in the block were invalidated, the SSD would spend a significant amount of time moving data from valid pages in the block to other blocks. Aside from the fact that programming valid data from an erase block may add significant overhead by itself, flash memory typically may be accessed only a finite number of times before the memory becomes unreliable (or worse, unusable). Therefore, it is desirable to minimize the amount of time spent programming valid data from an erase block. But at the same time, garbage collection may not be deferred until every page in an erase block is marked invalid: the flash memory might end up with every block containing only pages marked valid or invalid (that is, no free pages), which would mean no further data could be written to the flash memory.

Blockchain algorithms typically operate on a per-block (block of the blockchain) basis. For example, the FPGA 130 of the blockchain-aware storage device 100 may receive and verify incoming blocks of the blockchain a single block at a time or in integer units of blocks of the blockchain. Likewise, mining may be performed using only the information of a single block at a time or in integer units of blocks of the blockchain.

If the sizes of the NAND blocks were not aligned with the sizes of the blockchain blocks, then, for example, a write command could cause a blockchain block to extend across two or more different NAND blocks and perhaps cause some of the NAND blocks to be only partially filled with data from the blockchain block. Accordingly, if a blockchain block were later deleted from the non-volatile memory 140, then write amplification issues could occur as the garbage collector defragments the non-volatile memory 140.

Therefore, some aspects of embodiments of the present invention relate to storage modules 142 and flash translation logic 144 where the size of the NAND blocks and/or the size of the NAND pages of the storage modules 142 is aligned with the size of the unit size of the blocks of the blockchain. For example, the size of the NAND blocks may set such that the size of a blockchain block is a multiple of the size of a NAND block. In some embodiments, the multiple is one (e.g., the NAND block is the same size as the blockchain block). For example, the NAND blocks may have a size of, for example, 1 MiB, 2 MiB, or 20 MiB in accordance with the blockchain protocols expected to be used on the blockchain-aware storage device 100. By doing so, write amplification can be reduced or avoided because deletions of data would be performed in a manner that aligned with the sizes of the NAND blocks, thereby reducing or avoiding the issue of NAND blocks having only partially deleted data. Furthermore, aligning the page reads with single blocks may also provide some improvements in the speed of reads. Furthermore, in blockchain systems, the blocks are immutable once they are part of the blockchain, which means that blockchain algorithms do not need to overwrite or modify existing blocks in normal operations. This immutability of the blocks improves the endurance of the NAND flash storage modules 142 (because no rewriting in strictly necessary) and reduces or eliminates the overhead of garbage collection. In some embodiments where the NAND block size is aligned with the size of the blocks of the blockchain, the garbage collection process need not run at all on the NAND blocks storage blocks of the blockchain, which thereby allows the storage controller to provide better and more stable I/O performance, because less time or substantially no time would be needed to perform garbage collection.

Operating as a Key-value Store

In some embodiments of the present invention, the blockchain-aware storage device 100 implements a key-value interface, in which data "values" are accessed based on a unique "key," rather than a traditional "logical block" interface. For a more specific example of a key value data storage device, please see U.S. patent application Ser. No. 15/876,028 "Key Value SSD," filed in the United States Patent and Trademark Office on Jan. 19, 2018, the entire disclosure of which is incorporated by reference herein.

According to one embodiment of the present invention, each block of the blockchain (or portion thereof) that is stored in the blockchain-aware storage device 100 corresponds to a single "value," and the hash (or hash value) of the block is treated as its key. Accordingly, the key-value interface allows blocks of the block chain to be retrieved by supplying the hash of the block as the key. Furthermore, as noted above, the sizes of the NAND pages and/or NAND blocks can be chosen to match up with the sizes of the blocks of the blockchain, and each key (or hash value) can be used to look up a single corresponding NAND block, thereby allowing for a close or exact logical-physical mapping between the sizes of the blockchain blocks and the NAND blocks, thereby further improving the speed and longevity of the blockchain-aware storage device 100, as discussed above.

Operating as a Standard SSD

According to some embodiments of the present invention, the blockchain-aware storage device 100 can still operate to store non-blockchain specific data, such as the aforementioned bit files for reconfiguring the FPGA 130, program instructions for operating the processor 110 (e.g., for re-flashing the firmware), user data, non-blockchain related keys and values, and the like. In some embodiments, the FPGA 130 is not involved in the storage and/or retrieval of non-blockchain data to and/or from the non-volatile memory 140.

One example of the application of a blockchain-aware storage device 100, including the storage of non-blockchain specific data is in blockchain based, encrypted, distributed cloud storage schemes such as Storj (see, e.g., Wilkinson, Shawn, et al. "Storj a peer-to-peer cloud storage network." (2014).). A user of Storj can rent their own storage space to other users to receive rewards. Conversely, a user of Storj can also pay other users to store the user's data on the other users' storage devices. Generally, application specific client software (e.g., the StorjShare daemon) runs on a user's node to set up the node and register the node on the Storj network.

According to one embodiment of the present invention, application-specific client software is installed and run on the processor 110 and/or the FPGA 130 of the blockchain-aware storage device 100, such that the blockchain-aware storage device 100 itself becomes a node on a blockchain network, rather than setting up a complete computer system, attaching one or more standard storage devices to the computer system, and registering the computer system on the network. Accordingly, the blockchain-aware storage device 100 allows users to easily register a node to participate in the blockchain network without setting up a full computer system while also gaining the benefits of more efficient mining provided by the FPGA 130 and the cryptography accelerator 132. (For example, data stored by other users of the Storj system may be stored as non-blockchain data, as described above, while a distributed ledger portion of the Storj system may be processed and stored as blockchain data.)

Furthermore, in some embodiments, the FPGA 130 and the cryptography engine 132 enable accelerated encryption and decryption of data, thereby further improving the speed and/or energy efficiency of the system. In addition, the FPGA 130 may also be configured to compress and decompress user data, thereby potentially allowing more user data to be stored on the blockchain-aware storage device 100.

Network Switch

Figure 3:
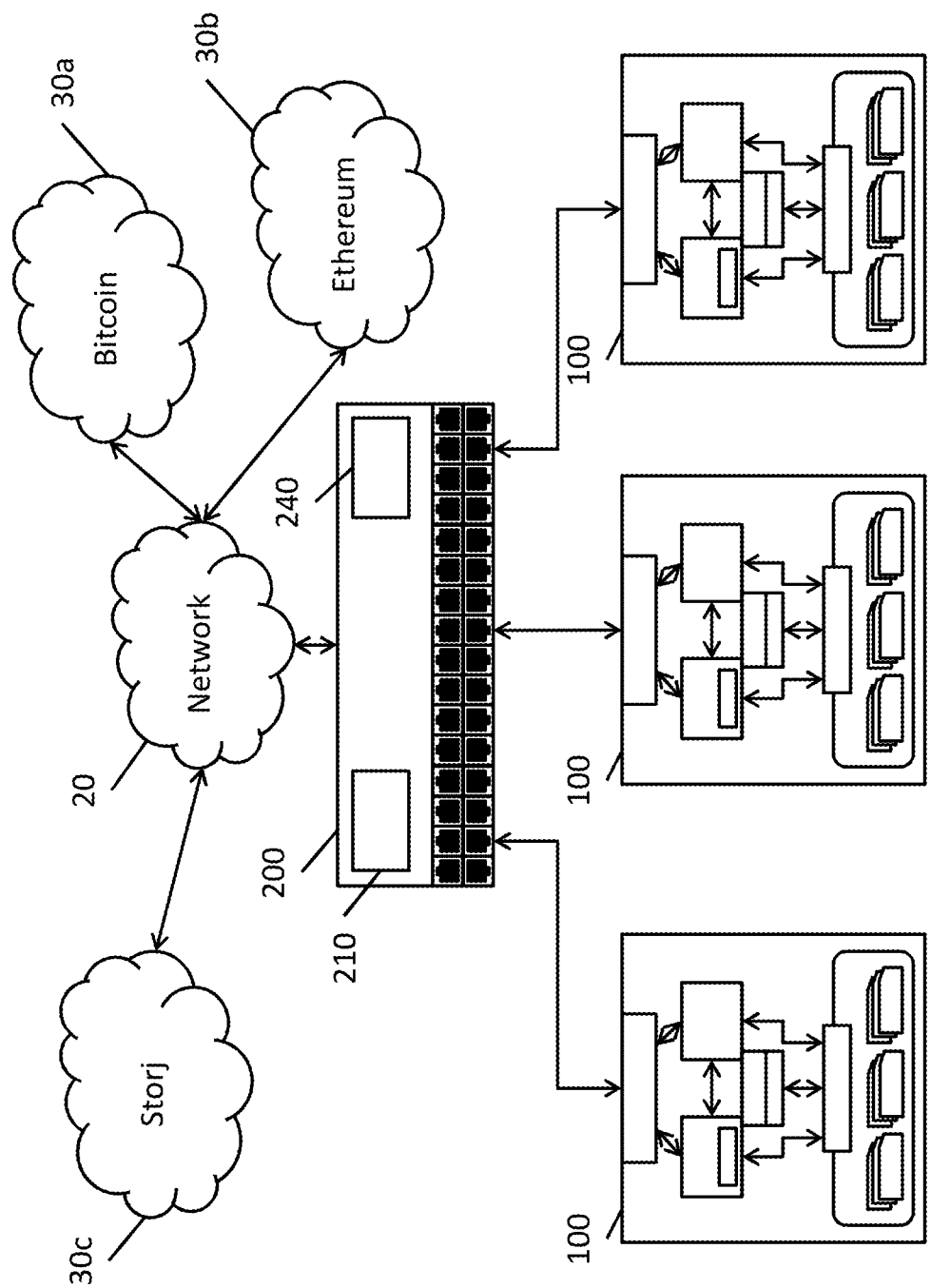
FIG. 3 is a schematic diagram of a blockchain networking device according to one embodiment of the present invention connected to a plurality of blockchain-aware storage devices according to one embodiment of the present invention.

Aspects of embodiments of the present invention are directed to programmable network hardware configured to manage blockchain-aware storage devices. FIG. 3 is a schematic diagram of a blockchain networking device according to one embodiment of the present invention connected to a plurality of blockchain-aware storage devices according to one embodiment of the present invention. As shown in FIG. 3, the network hardware 200 is connected to three different blockchain-aware storage devices 100, each of which is connected to the network hardware 200 over network (e.g., Ethernet) connections. The network hardware 200 is connected to a network 20 (e.g., the Internet), which provides access to different peer-to-peer blockchain networks 30 such as Bitcoin 30*a*, Ethereum 30*b*, and Storj 30*c*. In some embodiments of the present invention the network hardware 200 is implemented as a software defined network (SDN). In some embodiments of the present invention, the network hardware 200 includes a processor and memory and is configured to switch or route data (e.g., packets) between the blockchain-aware storage devices 100 and the network 20 based on logic and data (e.g., routing tables) stored in the memory of the network hardware 200.

In some embodiments of the present invention, the network hardware 200 (e.g., a router or a switch) is operated in pass-through mode, where the network hardware 200 acts as a dummy device with no additional compute. Instead, the individual drives 100 behind the network hardware 200 are registered onto various ones of the blockchain networks 30. In some embodiments, the blockchain-aware storage devices 100 independently determine which blockchain network 30 to join (e.g., based on information retrieved via the network 20 regarding current economic values of mining on any one of the networks, current electricity costs of operating the blockchain-aware storage device 100 and the current state of the blockchain-aware storage device 100 such as the amount of free space in the non-volatile memory 140) using program logic stored in the firmware of the blockchain-aware storage device and executed by the processor 110.

Figure 4:
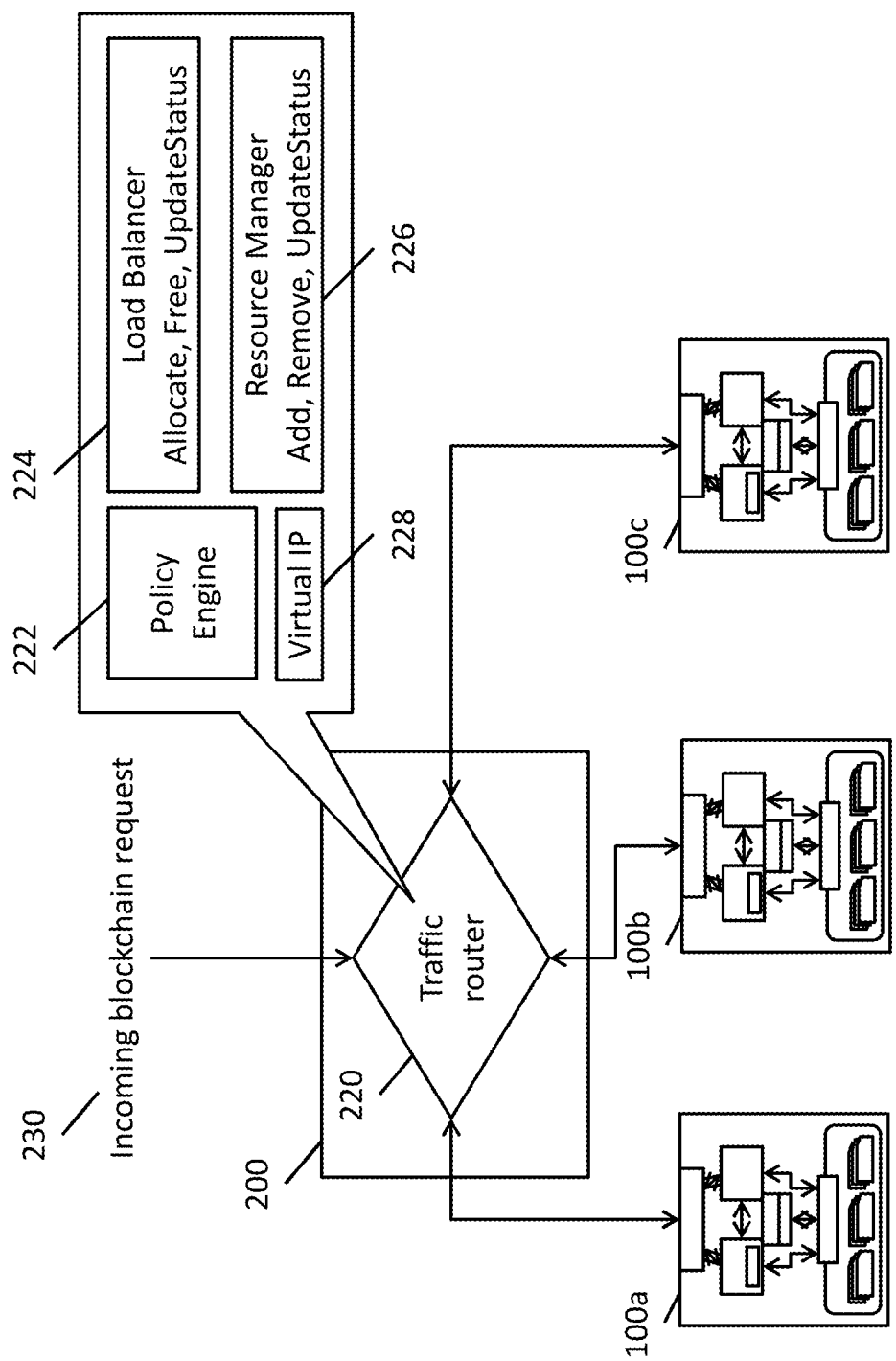
FIG. 4 is a schematic diagram of a blockchain networking device according to one embodiment of the present invention having a blockchain-aware traffic router connected to a plurality of blockchain-aware storage devices according to one embodiment of the present invention.

In some embodiments of the present invention, the network hardware is configured to operate as a blockchain-aware traffic router module, and allocates computational resources and storage resources from the connected blockchain-aware storage devices to perform the mining functions in accordance with particular policies. FIG. 4 is a schematic diagram of a blockchain networking device according to one embodiment of the present invention having a blockchain-aware traffic router connected to a plurality of blockchain-aware storage devices according to one embodiment of the present invention. As shown in FIG. 4, the network hardware 200 may include a blockchain-aware traffic router 220. In some embodiments, the blockchain-aware traffic router 220 is implemented using a processor 210 integrated into the network hardware 200, such as a general purpose central processing unit (CPU) that is configured to perform blockchain-aware traffic routing decisions, as described in more detail below.

As shown in FIG. 4, in some embodiments, the traffic router 220 includes a policy engine 222, a load balancer 224, a resource manager 226, and a virtual IP provider 228. The virtual IP provider 228 is configured to allocate virtual IP addresses to the network storage nodes. The resource manager 226 is configured to track how many blockchain-aware storage devices 100 are connected to the network hardware 100, where the "Add" command is executed to register a blockchain-aware storage device 100 to the resource manager, the "Remove" command is to unregister a blockchain-aware storage device 100 from the resource manager, and the "UpdateStatus" command is used to check on the current status of the connected blockchain-aware storage devices 100. The policy engine 222 stores and implements policies for registering particular blockchain networks 30 (e.g., Bitcoin 30a, Ethereum 30b, and Storj 30c) and actively monitors the reward systems for the different networks to determine the value of mining on any given network. The load balancer 224 manages the connected resources (e.g., the connected blockchain-aware storage devices 100) to share and redirect incoming blockchain requests 230 (e.g., requests to verify Bitcoin blocks, requests to store data from the Storj network, and the like).

In the embodiment shown in FIG. 4, blockchain-aware storage device 100a is configured to handle Bitcoin requests, blockchain-aware storage device 100b is configured to handle Ethereum requests, and blockchain-aware storage device 100c is configured to handle Storj requests, in the sense that the FPGA 130 of each blockchain-aware storage device 100 is programmed or configured to implement the corresponding blockchain algorithm that it is assigned to handle. According to some embodiments of the present invention, the policy engine 222 determines, based on its monitoring of the current values of mining on various networks, that the blockchain-aware storage devices 100 can be reassigned to operate on a different blockchain network. For example, if the value of mining Ethereum has increased without a corresponding increase in the value of mining Bitcoin, the policy manager 222 may determine that it would be more cost effective to reconfigure an additional one of the blockchain-aware storage devices 100 to also mine Ethereum (e.g., blockchain-aware storage device 100a). Accordingly, the traffic router 220 identifies a more efficient or valuable reassignment and transmits a command to blockchain-aware storage device 100a to reconfigure or reprogram its FPGA 130 to implement the Ethereum mining algorithm (e.g., loading a bit file to reprogram the FPGA to implement the Ethereum mining algorithm, as described above) and updates the status of blockchain-aware storage device 100a in the resource manager 226 to indicate that blockchain-aware storage device 100a is now configured to operate on the Ethereum network. As such, any new requests relating to the Ethereum network can be routed by the traffic router 220 to any of the blockchain-aware storage devices 100 that are configured to handle Ethereum requests (in this example, blockchain-aware storage device 100a and blockchain-aware storage device 100b).

In some embodiments of the present invention, the network hardware 200 also includes additional computational units 240 (which may include the processor 210, see FIG. 3) such as an FPGA, a baseboard management controller (BMC), and/or a CPU that can create a mining pool from the connected blockchain-aware storage devices 100. In some embodiments, the computational units also perform mining operations (e.g., the network hardware 200 may also be a miner, and, in some embodiments, also includes a cryptography accelerator). In some such embodiments, the mining node implemented by the network hardware 200 is exposed through a virtual IP address created by the network hardware 200 for accessing the internal mining node. As noted above, different ones of the blockchain-aware storage devices 100 may be configured to handle requests from different blockchain networks and to implement different blockchain algorithms, and the traffic manager 220 routes requests to the different nodes accordingly. Different blockchain-aware storage devices 100 that are configured to handle requests from the same blockchain network may be considered to be members of the same mining pool.

In addition, in some embodiments in which the network hardware 200 itself is treated as a mining node, the traffic manager 220 of the network hardware 200 is configured to offload some or all of the computational and storage tasks relating to executing blockchain mining algorithms to one or more of the blockchain-aware storage devices 100 connected to the network hardware 200. In some embodiments, incoming blockchain requests are routed directly to a blockchain-aware storage device 100 that are configured to handle those types of requests (e.g., the FPGA 130 of the device is configured to perform the corresponding blockchain mining algorithm). In some embodiments, various sub-tasks of the mining request are divided among one or more blockchain-aware storage device 100 that are configured to handle those types of requests.

As such, aspects of embodiments of the present invention relate to programmable blockchain-aware storage devices that are configured to perform operations associated with blockchain networks, such as mining blocks of a blockchain and verifying blocks of a blockchain. The non-volatile memory of a blockchain-aware storage device according to some embodiments of the present invention can be configured such that the accesses to the memory are aligned with the sizes of the blocks of the blockchain, thereby reducing memory fragmentation, reducing the need for garbage collection, and reducing the effect of write amplification. In some embodiments of the present invention, blockchain-aware network hardware such as a network router or network switch is configured to manage one or more blockchain-aware storage devices by, for example, distributing mining tasks to the devices and reconfiguring the blockchain-aware storage devices to implement different algorithms based on demand.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A programmable data storage device comprising:
a non-volatile memory;
a storage controller configured to control the non-volatile memory;
a network interface; and
a field programmable gate array configured to:
   implement a blockchain algorithm; and
   store at least one block of a blockchain corresponding to the blockchain algorithm in the non-volatile memory via the storage controller; and
a processor having memory coupled thereto, the memory having instructions stored thereon that, when executed by the processor, cause the processor to:
   send and receive one or more blocks of the blockchain via the network interface; and
   control the field programmable gate array to execute the blockchain algorithm on the one or more blocks of the blockchain,
wherein the memory further has instructions stored thereon that, when executed by the processor, cause the processor to:
   load a bit file for programming the field programmable gate array to implement a second blockchain algorithm different from the blockchain algorithm; and
   program the field programmable gate array using the bit file to reconfigure the field programmable gate array to implement the second blockchain algorithm.

2. The programmable data storage device of claim 1, wherein the storage controller implements a key-value store, and
wherein the storage controller is configured to store the at least one block of the blockchain as a value of the key-value store in association with a hash value of the block as a key.

3. The programmable data storage device of claim 1, wherein the storage controller is configured to store a first type of data and a second type of data in the non-volatile memory, wherein the first type of data is blockchain data and the second type of data is different from the first type of data.

4. The programmable data storage device of claim 1, wherein the memory has instructions stored thereon that, when executed by the processor, cause the processor to operate the programmable data storage device as a blockchain node of a blockchain network.

5. The programmable data storage device of claim 1, wherein the bit file is stored in the non-volatile memory.

6. The programmable data storage device of claim 1, wherein the bit file is received via the network interface.

7. The programmable data storage device of claim 1, wherein the field programmable gate array comprises a cryptographic accelerator, and
wherein the field programmable gate array is configured to implement the blockchain algorithm using the cryptographic accelerator.

8. The programmable data storage device of claim 1, further comprising:

a second non-volatile memory;
a second storage controller configured to control the second non-volatile memory;
a second network interface; and
a second field programmable gate array configured to:
   implement the blockchain algorithm; and
   store at least one block of the blockchain corresponding to the blockchain algorithm in the second non-volatile memory via the second storage controller; and
a second processor having a second memory coupled thereto, the second memory having instructions stored thereon that, when executed by the second processor, cause the second processor to:
   send or receive one or more blocks of the blockchain via the second network interface; and
   control the second field programmable gate array to execute the blockchain algorithm on the one or more blocks of the blockchain.

9. The programmable data storage device of claim 1, wherein the storage controller is configured to store data in the non-volatile memory in accordance with a first size,
wherein each block of the blockchain has a second size, and
wherein the second size is a multiple of the first size.

10. The programmable data storage device of claim 9, wherein the second size is equal to the first size.

11. The programmable data storage device of claim 9, wherein the non-volatile memory comprises NAND flash,
wherein the storage controller comprises a flash translation logic module, and
wherein the first size is a NAND block size.

12. A programmable network data storage system comprising:
a first programmable data storage device comprising:
   a first non-volatile memory;
   a first storage controller configured to control the first non-volatile memory;
   a first network interface; and
   a first field programmable gate array configured to:
      implement a first blockchain algorithm; and
      store at least one block of a first blockchain corresponding to the first blockchain algorithm in the first non-volatile memory via the first storage controller; and
   a first processor having a first memory coupled thereto, the first memory having instructions stored thereon that, when executed by the first processor, cause the first processor to:
      send and receive one or more blocks of the blockchain via the first network interface; and
      control the first field programmable gate array to execute the first blockchain algorithm on the one or more blocks of the first blockchain;
a second programmable data storage device comprising:
   a second non-volatile memory;
   a second storage controller configured to control the second non-volatile memory;
   a second network interface; and
   a second field programmable gate array configured to:
      implement a second blockchain algorithm; and
      store at least one block of a second blockchain corresponding to the second blockchain algorithm in the second non-volatile memory via the second storage controller; and
   a second processor having a second memory coupled thereto, the second memory having instructions stored thereon that, when executed by the second
processor, cause the second processor to:
send and receive one or more blocks of the second
blockchain via the second network interface; and
control the second field programmable gate array to
execute the second blockchain algorithm on the
one or more blocks of the second blockchain;
network hardware configured to communicate with:
the first programmable data storage device through the
first network interface;
the second programmable data storage device through
the second network interface; and
at least two blockchain networks,
the network hardware comprising a third processor and a
third memory, the third memory having instructions
stored thereon that, when executed by the third processor, cause the third processor to:
receive a blockchain request from the at least two
blockchain networks; and
distribute the blockchain request to at least one of the
first programmable data storage device and the second programmable data storage device,
wherein the first memory further has instructions stored
thereon that, when executed by the first processor,
cause the first processor to:
load a bit file for programming the first field programmable gate array to implement a third blockchain
algorithm different from the first blockchain algorithm; and
program the first field programmable gate array using
the bit file to reconfigure the first field programmable
gate array to implement the third blockchain algorithm, and
wherein the third memory of the network hardware further has instructions stored thereon that, when executed
by the third processor, cause the third processor to:
control the first processor of the first programmable
data storage device to execute the instructions to
reconfigure the first field programmable gate array to
implement the third blockchain algorithm.

13. The system of claim 12, wherein the first blockchain algorithm is different from the second blockchain algorithm, wherein the third memory of the network hardware further has instructions stored thereon that, when executed by the third processor, cause the third processor to:
determine whether the blockchain request is associated with at least one of the first blockchain algorithm and the second blockchain algorithm;
in response to determining that the blockchain request is associated with the first blockchain algorithm, distribute the blockchain request the first programmable data storage device; and
in response to determining that the blockchain request is associated with the second blockchain algorithm, distribute the blockchain request the second programmable data storage device.

14. The system of claim 12, wherein the instructions to distribute the blockchain request comprise instructions that, when executed by the third processor, cause the third processor to:
divide the blockchain request into a plurality of sub-tasks; and
distribute the sub-tasks to the first programmable data storage device and the second programmable data storage device.

15. The system of claim 12, wherein the third memory of the network hardware further has instructions stored thereon that, when executed by the third processor, cause the third processor to:
monitor states of each of the at least two blockchain networks;
track a first status of the first programmable data storage device and a second status of the second programmable data storage device;
identify a reassignment of the second programmable data storage device based on the states of each of the at least two blockchain networks, the first status, and the second status; and
reconfigure the second field programmable gate array of the second programmable data storage device to implement the first blockchain algorithm in accordance with the reassignment.

16. The system of claim 12, wherein the first storage controller implements a key-value store, and
wherein the first storage controller is configured to store the at least one block of the first blockchain as a value of the key-value store in association with a hash value of the block as a key.

17. The system of claim 12, wherein the first memory has instructions stored thereon that, when executed by the first processor, cause the first processor to operate the first programmable data storage device as a blockchain node of at a blockchain network of the at least two blockchain networks.

18. The system of claim 12, wherein the first storage controller is configured to store data in the first non-volatile memory in accordance with a first size,
wherein each block of the first blockchain has a second size, and
wherein the second size is a multiple of the first size.

19. The system of claim 18, wherein the first non-volatile memory comprises NAND flash,
wherein the first storage controller comprises a first flash translation logic module, and
wherein the first size is a NAND block size.

* * * * *